United States Patent [19]

Wright, Jr.

[11] Patent Number: 4,550,589

[45] Date of Patent: Nov. 5, 1985

[54] SYSTEM FOR MONITORING SNUBBER LOADS

[75] Inventor: William S. Wright, Jr., Corona Del Mar, Calif.

[73] Assignee: Pacific Scientific Company, Anaheim, Calif.

[21] Appl. No.: 606,287

[22] Filed: May 2, 1984

[51] Int. Cl.⁴ ............................................. G01M 7/00
[52] U.S. Cl. ........................................ 73/11; 188/378; 340/665; 340/668; 340/683; 376/245; 376/285
[58] Field of Search .................... 73/11; 340/665, 668, 340/683, 540, 539; 376/285, 245

[56] References Cited

U.S. PATENT DOCUMENTS

| | | | |
|---|---|---|---|
| 2,587,628 | 3/1952 | King | 73/11 |
| 3,833,094 | 9/1974 | Grossman | 73/11 |
| 4,314,473 | 2/1982 | Sulzer | 73/11 |
| 4,429,563 | 2/1984 | Sulzer | 73/11 |
| 4,458,234 | 7/1984 | Brisard | 340/665 |

Primary Examiner—Donald O. Woodiel
Attorney, Agent, or Firm—Knobbe, Martens, Olson & Bear

[57] ABSTRACT

Constant or transient forces and displacements between a motion snubber and its associated load are detected and converted to an electrical signal. Electrical signals from the detection devices are transmitted to a receiving device which is electrically connected to a recording means. The signals from a plurality of detecting devices are encoded to identify the snubber having the detected force and displacement.

18 Claims, 9 Drawing Figures

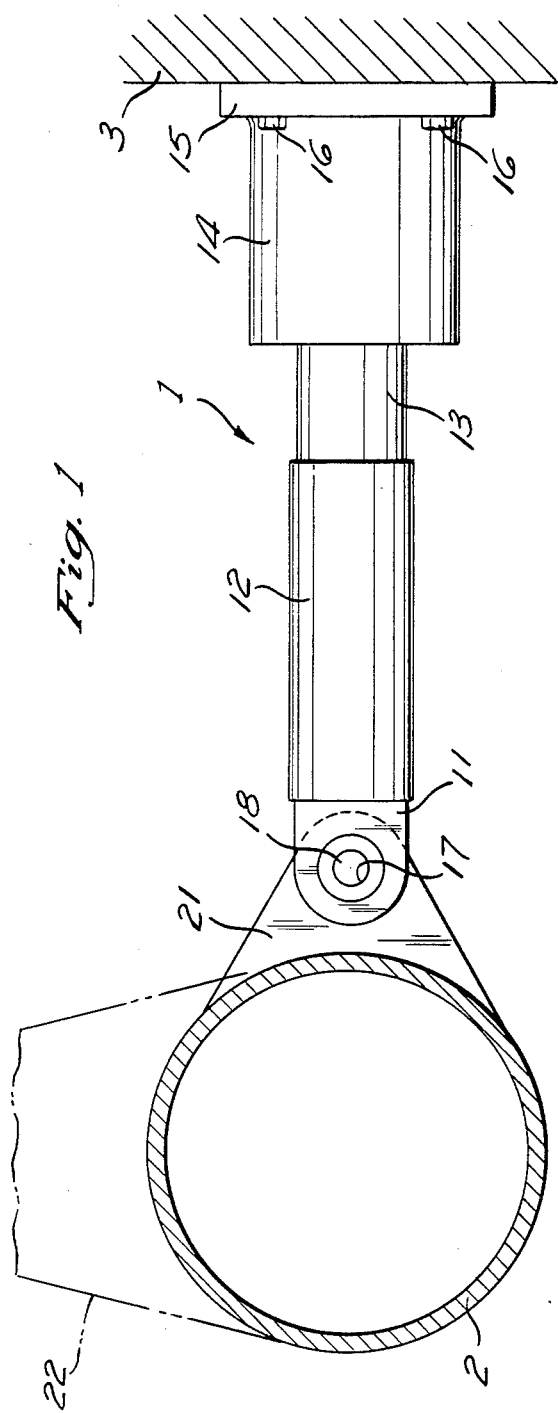
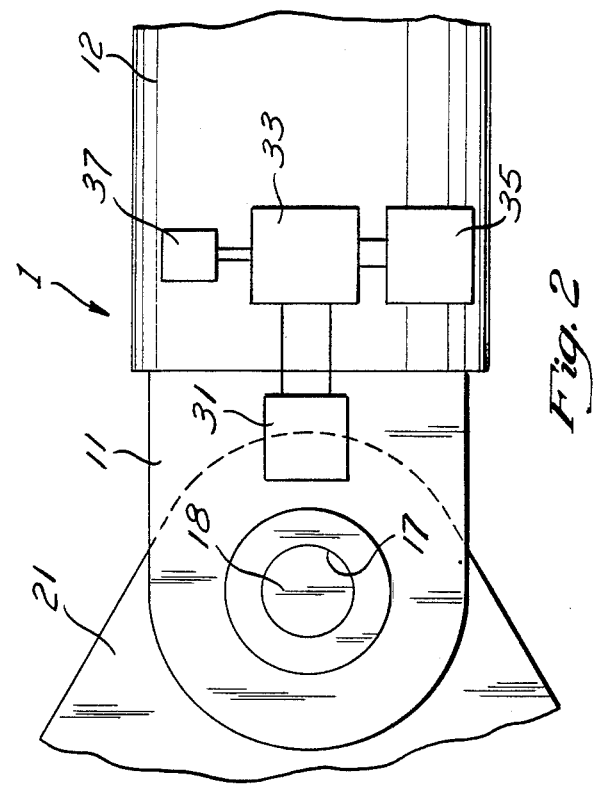
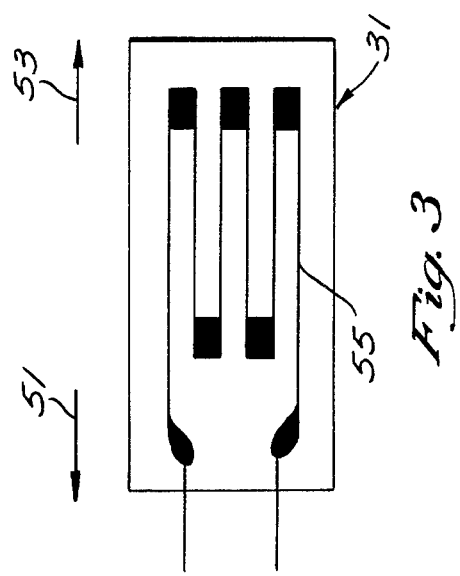
Fig. 1
Fig. 2
Fig. 3

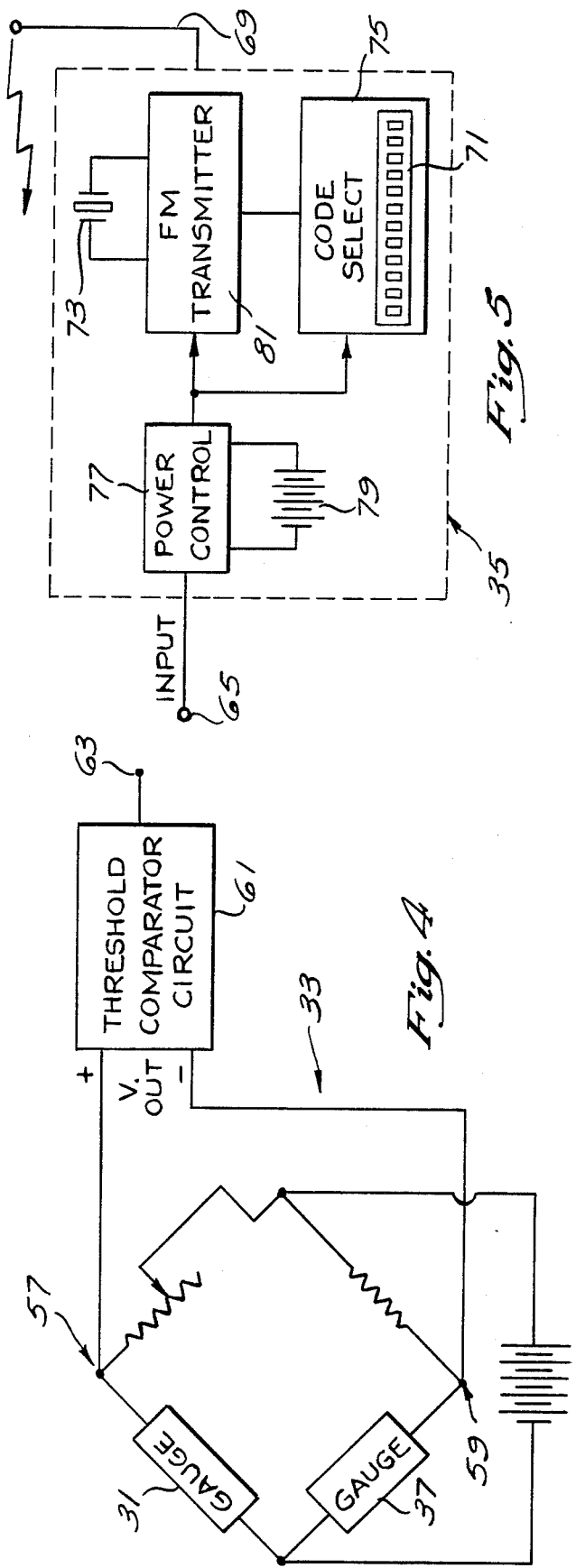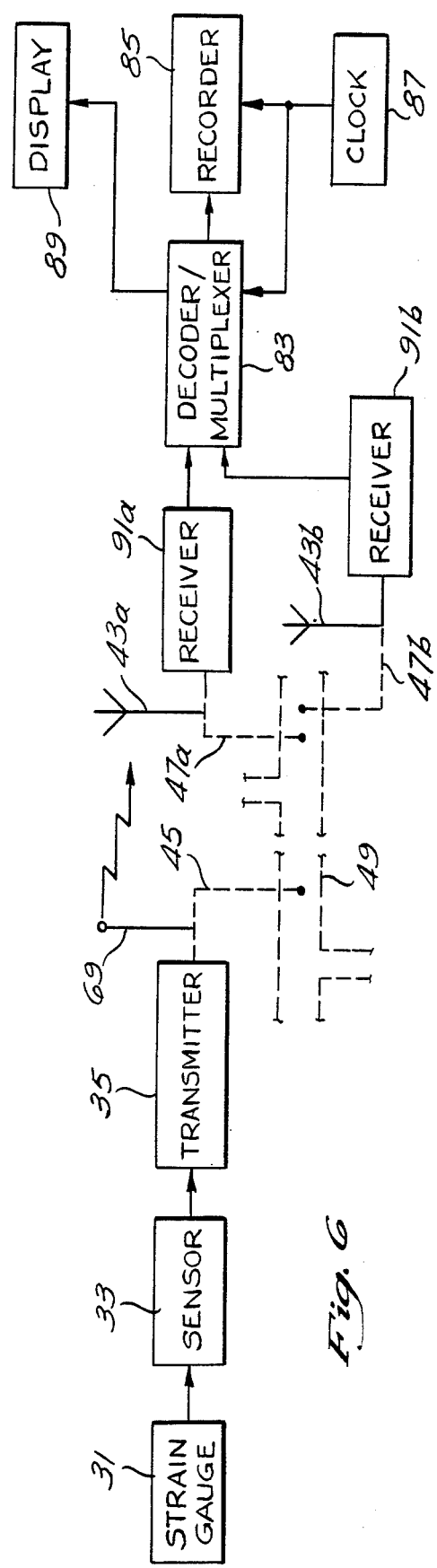

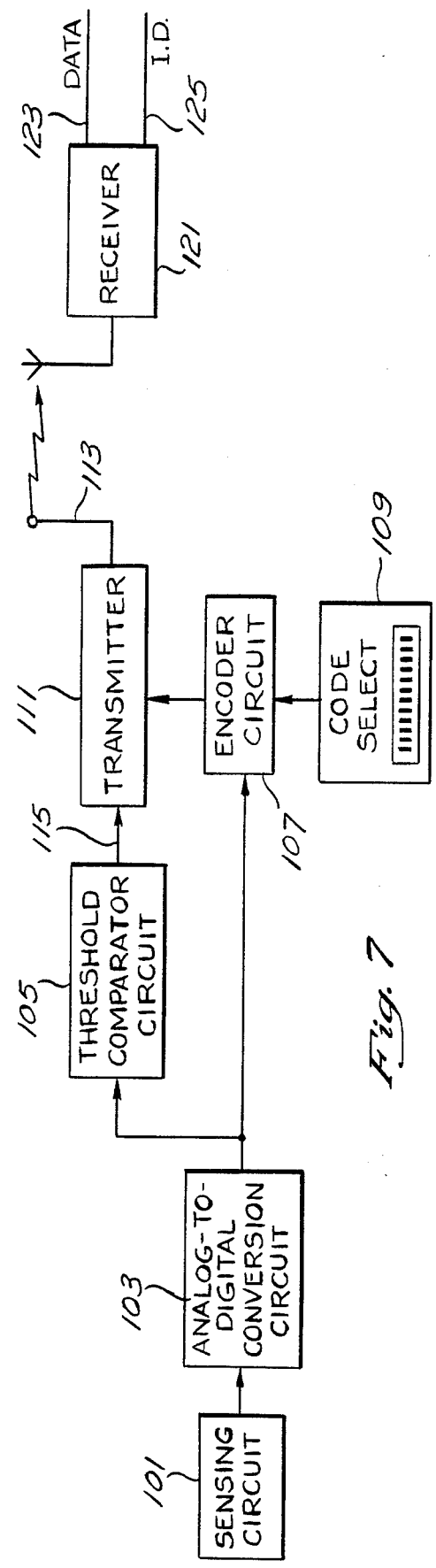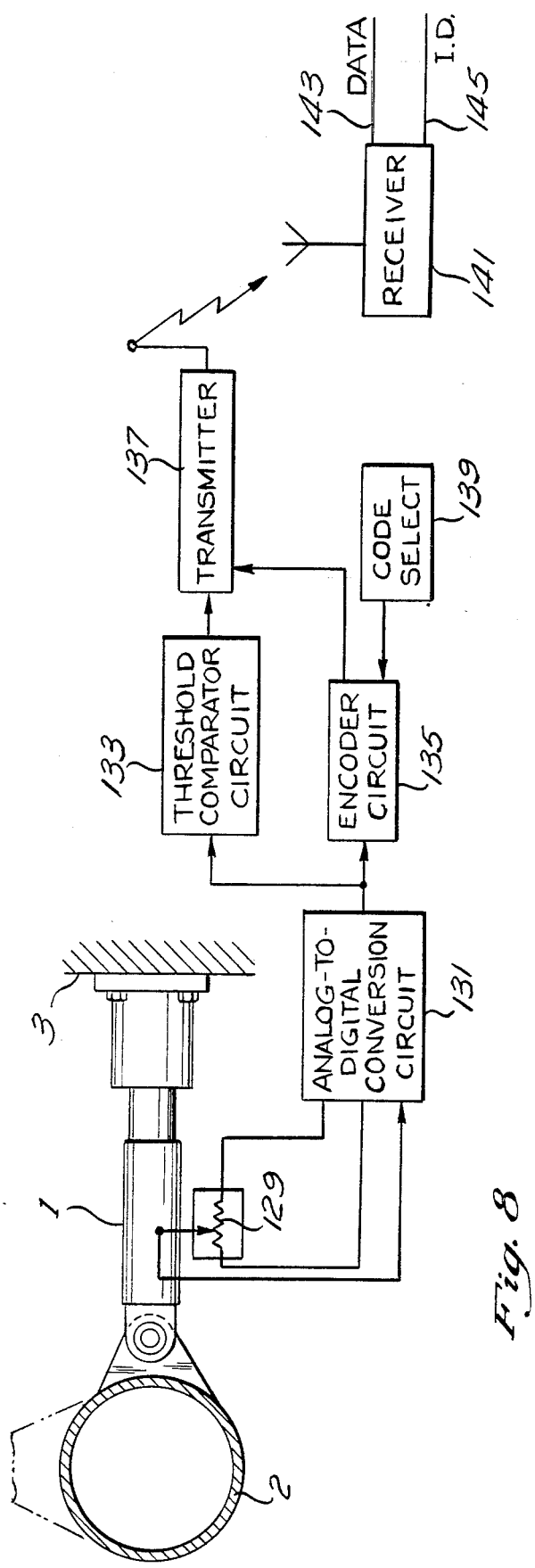

SYSTEM FOR MONITORING SNUBBER LOADS

This invention relates to an apparatus for detecting sustained or transient loads on a snubber device. More particularly, the invention is directed to a means of providing remote sensing of such loads.

BACKGROUND OF THE INVENTION

In atomic energy electric generating plants, and similar facilities, there are many pipes carrying high pressure or high temperature fluids such as steam, water, sodium and other material. These pipes are supported and spaced from the walls or ceilings of a building or other surrounding support structure. In geographical areas where frequent earthquakes occur, there is serious concern that such pipes may rupture during an earthquake because of the rapid relative movement between the pipes and the rest of the building. Accordingly, there is a current requirement that snubbing devices be attached to the pipes and the adjacent support structure to prevent or dampen such rapid relative movement. During normal operation, the pipe must be able to expand and contract a considerable amount because of the changing temperature differentials, particularly during start up and shut down of the facility. Hence, the snubber must permit this slow relative movement while preventing the rapid movement of the pipe caused by an earthquake. After snubbing rapid movement, the device must recover automatically to once more permit slow movement of the pipe in either direction relative to its surrounding support structure. The snubber must of course be highly reliable for long periods of time because of the expense of providing access to repair or replace a malfunctioning snubber. Because of radiation and heat, maintenance presents a health hazard also. Moreover, the snubbing capability must remain ready at all times even though it may never be used. The failure of the snubber could of course result in a safety hazard and huge economic losses if a large power generating station should be shut down or destroyed.

The earliest snubbers were primarily hydraulic. However, a major shortcoming of hydraulic snubbers is that the hydraulic fluid and the seals employed deteriorate after a period of time, particularly when subjected to radiation. The hydraulic fluid tends to become a rubbery substance while the seals lose their flexibility and become hard and ceramic-like. Frequent servicing of hydraulic units is therefore necessary and is expensive.

The maintenance problems associated with hydraulic snubbers were significantly reduced by the development of a mechanical snubbing device described in "Acceleration Sensitive Motion Snubber", U.S. Pat. No. 3,876,040, assigned to the same assignee as the invention herein. The device does not rely upon hydraulic fluid, and thus is not affected by radiation or heat.

Although the aforementioned device significantly reduced the maintenance requirements, any mechanical device is subject to failures. Furthermore, a substantial number of hydraulic snubbers and other more failure-prone devices are still in wide use. Therefore, maintenance requirements still exist.

Because of the high heat and the potential radiation hazard, routine inspection and maintenance of the snubbers in an atomic energy electric generating plant is not feasible. Typically, a maintenance plan requires that 10% of the snubbers in a facility be inspected during the periodic refueling shut downs of the plant. Since the refueling shut downs may only occur every eighteen months or so, each snubber is inspected only once every fifteen years under this plan. It is not at all unlikely that the inspected snubbers will be in good working order while a defective snubber can remain undetected for a number of years.

Since the obvious alternative of sending a larger crew in to inspect all snubbers during each maintenance cycle is not economically feasible, nor is it desirable from a health hazard standpoint, an alternative means for detecting defective snubbers is desirable. Thus far, no such means have been available.

SUMMARY OF THE INVENTION

In accordance with the present invention, a remote sensing device is disclosed which monitors the effect of pipe motion on pipe motion snubbers in a piping system. The effect of pipe motion can result in forces on pipe motion snubbers or displacement of pipe motion snubbers. Both effects can be continuously monitored and signals can be transmitted to a remotely located indicating and recording device in response to effects in excess of preset "trip" amounts or in response to commands.

The data transmitter is mounted in close proximity to the sensing device and is turned on by the "trip" signal from the force sensing device. The transmitted signal is encoded by digital or other encoding means to identify the snubber from which the signal originates. Furthermore, transmitters in the same general vicinity can operate at different frequencies to avoid interference between simultaneously operating transmitters.

Typically, the data transmission will be a high-frequency, frequency-modulated wireless signal. Alternatively, a low-power signal can be transmitted by using the piping system as the conductors. Other modulating and transmitting schemes can be used.

In the preferred embodiments of the apparatus, the force sensing devices and data transmitting devices are battery operated. This eliminates the need for running electrical wiring throughout the facility, and reduces the probability of sensor failure as a result of accidental disconnection of the electrical supply. Since the data transmitter typically only transmits in the event of a detected trip force or in response to a command, the battery requirements are reduced to a minimal amount.

The data receiver system continuously monitors the frequencies at which the various transmitters are operating. Any transmission received from one of the transmitters will be retransmitted by hard wire to a recording system. The receiver system will typically be located in a non-hazardous area and can be maintained normally. Furthermore, the receiver system can run on alternating current power.

The recording system continuously monitors the signals received by the receiver system. When a signal is received, it is decoded to determine the location of the snubber which originated the signal. The identification is recorded along with the date, time, and duration of the transmission. Furthermore, an indicator, such as a light, is activated to indicate that a signal has been received from a particular snubber. Thus, the maintenance personnel can direct their maintenance efforts toward those snubbers which have indicated an excessive force or displacement. The system for recording the snubber signals can be a magnetic tape, a printout, or other permanent recording means.

Alternatively, the apparatus includes means for transmitting the magnitude of the detected force or displacement to the receiver system. The magnitude can be transmitted in response to a detected excessive force or displacement or in response to a command from a remote location.

BRIEF DESCRIPTION OF THE DRAWINGS

FIG. 1 is a side elevation of a typical snubber interconnecting a pipe with a supporting structure.

FIG. 2 illustrates the mounting of the stress/strain sensor and the transmitter on the snubber.

FIG. 3 illustrates a typical strain gauge.

FIG. 4 illustrates a typical sensing circuit.

FIG. 5 illustrates a typical transmitter circuit.

FIG. 6 is a block diagram of the overall apparatus showing the interconnections between the subsystems.

FIG. 7 is a block diagram of an alternative embodiment of the invention including means for transmitting the magnitude of the force on the snubber.

FIG. 8 is a block diagram of an alternative embodiment of the invention which detects and transmits the magnitude of the displacement of the snubber.

DETAILED DESCRIPTION OF THE DRAWINGS

Figure 9:
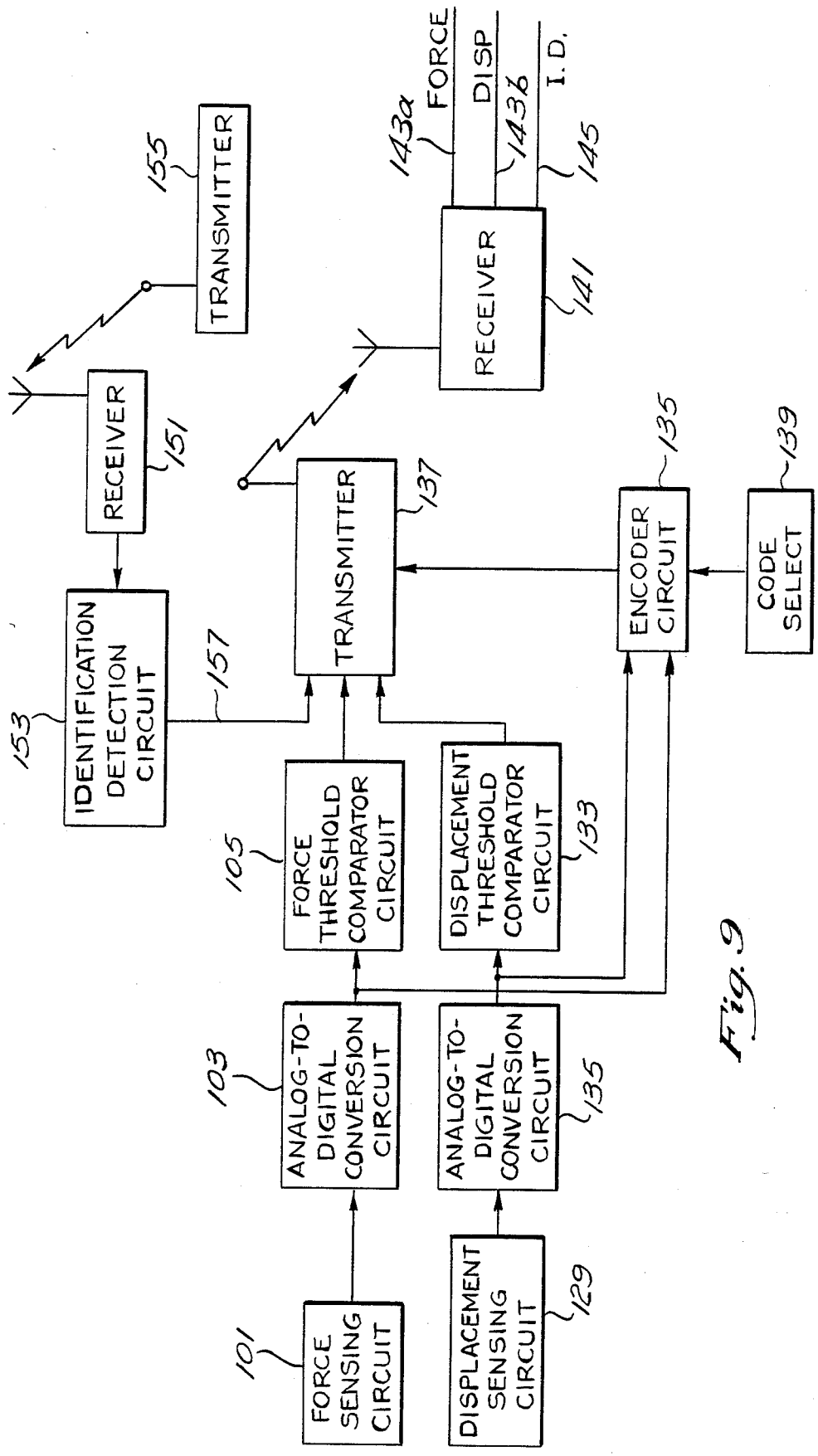
FIG. 9 is a block diagram of an especially preferred embodiment which detects and transmits both force and displacement magnitudes, and which responds to commands from the remote monitor.

FIG. 1 illustrates a typical snubbing device 1, mounted to a support structure 3 and connected with a pipe 2 (shown in cross-section). The snubber 1 is illustrated connected to a metallic ear 21 which is either welded or strapped to the pipe 2. Typically, the snubber 1 will have a tongue 11 which has a hole 17 through which a pin or clevis 18 is inserted for attaching the tongue 11 to the ear 21. The pipe is typically suspended from above by conventional pipe hangers 22 as shown in phantom lines.

The body of the snubber 1 generally comprises an outer shell 12 which is telescopically mounted on an inner member 13 attached to a base 14 and a base mount 15. The base mount 15 is fastened to a solid support structure 3 such as a beam or wall via suitable fastening means such as bolts 16.

Internally, the snubber 1 can have a motion damping means such as a hydraulic system similar to a shock absorber, or an inertial mass system and capstan spring such as found in the invention described in U.S. Pat. No. 3,876,040.

In the device illustrated in FIG. 1, slow lateral movements of the pipe 2 will cause telescoping of shell 12 over member 13. Thus, the snubber 1 will accommodate slow movements of the pipe 2 caused by thermal expansion or other sources. If the pipe begins to move rapidly, such as would occur during an earthquake, the dampening effect of the snubber 1 will snub such movement, and will only allow gradual oscillating movement. It will also allow gradual movement caused by a sustained force in one direction. If the snubber 1 becomes defective such that it will not accommodate gradual movement, tremendous stresses on a pipe caused by thermal expansion cannot be relieved. This can result in fatigue of a pipe and possible fracture of the pipe.

Since under normal operation the shell 12 of snubber 1 moves to accommodate a force exerted by the pipe, ordinarily, there would be no sustained stress on the snubber tongue 11. However, if the snubber fails, the force of the pipe 2 pushing on or pulling on the tongue 11 will not be relieved by the movement of the shell 12. The device described hereinafter detects the presence of a sustained stress on the tongue 11 and transmits a signal to a monitoring and recording device to alert maintenance personnel of the presence of a potentially defective snubber.

The primary component of the present invention comprises a strain gauge 31, a sensing circuit 33, and a data transmitter 35, shown in FIG. 2, mounted to the tongue 11 and shell 12 of a typical snubber 1.

Although other strain gauges, such as a fiber optic strain gauge, could be used, a typical application would use a foil strain gauge such as that depicted in FIG. 3. Forces in the directions indicated by arrows 51, 53 cause the resistance of the foil pattern 55 to vary because of minute increases or decreases in the dimensions of the foil. These changes in resistance can be detected by the sensing circuit 33 and used to generate a signal if the resistance changes exceed an amount proportional to a threshold value of stress. Typically, the changes in resistance of the strain gauge would be detected by a Wheatstone bridge circuit or other resistance sensitive circuit. Other types of strain gauges would be connected to the appropriate sensing circuit.

FIG. 4 illustrates a typical Wheatstone bridge circuit 33 for detecting the resistance changes. Gauge 31 is mounted on the tongue 11 of the snubber 1 as illustrated in FIG. 2. It forms one leg of a balanced bridge. Gauge 37 is mounted on the shell portion of the snubber in a position such that it is not subjected to stress. Typically, gauge 37 will be mechanically isolated from the snubber, but will be thermally connected. Thus, gauge 37 will be subjected to the same temperature changes as gauge 31, and will therefore cancel out any resistance changes caused by temperature.

Stress on gauge 31 will cause resistance changes which will generate a voltage across nodes 57, 59. The voltage can be detected by a threshold comparator circuit 61 which can be adjusted to respond to a voltage proportional to a selected "trip" load. The output node 63 will be inactive except when the stress on tongue 11 (shown in FIG. 2) exceeds a selected "trip" load.

Although each threshold comparator could be electrically connected directly to an indicator circuit, generally the amount of wiring required would be prohibitive and vulnerable to damage in a large piping system. Therefore, in the preferred embodiment, the output of the threshold comparator circuit 63 (shown in FIG. 4) is the input to node 65 of data transmitter 35 shown in FIG. 5. The data transmitter 35 is typically a battery operated transmitter which generates a frequency-modulated signal on antenna 69. Alternatively, as illustrated in phantom lines in FIG. 6, antenna 69 can be replaced by a capacitively-coupled, hard-wired connection 45 to the piping system 49.

The data transmitter 35 does not transmit under ordinary circumstances. If an active input is received on node 65, power control circuit 77 electrically interconnects battery 79 to FM transmitter circuit 81 and code select circuit 75. The transmitter circuit 81 generates a high-frequency signal which is frequency-modulated by the output of code select circuit 75. At other times, the transmitter circuit 81 and code select circuit 75 do not consume power from the battery. Battery 79 can be the same battery as the battery used by the sensing circuitry 33.

Because of the possible interferences between transmitters located in the same general vicinity, the transmitter circuit 81 is controlled by a crystal 73, or other frequency selection means, which allows a number of transmitters to operate simultaneously without interference.

Since the purpose of the device is to locate the snubber which is generating the signal, the frequency-modulated signal is encoded with a binary signal, or other encoding means, to discretely identify each snubber. In a typical application, the code select circuit 75 has a multi-pole switch 71 which can be adjusted to provide a discrete code for the transmitter. In the device illustrated in FIG. 5, the switch 71 comprises twelve single pole double throw switches, which provides a means of selecting one of $4,096(2^{12})$ codes. Alternatively, the switch 71 can be 3 16-position thumbwheel switches, or the like. Binary encoding of a frequency modulated signal is well known to those skilled in the art. Typically, a binary one will be transmitted as a frequency offset from the carrier frequency, while a binary zero will be transmitted either as the carrier frequency or as a frequency offset from the carrier frequency in the opposite amount from the binary one. Typically, the transmitted binary identification code will be preceded by start bits and followed by stop bits, such as in a teletype code, to aid the receiver circuit in synchronizing the received information.

FIG. 6 is a block diagram of the overall apparatus showing the interconnections between the subsystems. The strain gauge 31, sensor 33, and data transmitter 35 have been previously described. Data receiver 91a is tuned to the frequency of data transmitter 35 and continuously monitors that frequency. The data receiver 91a receives signals via antenna 43a or via the hard wired connection 47a to the piping system 49. Since the data receiver 91a is located in a non-hazardous area, it can be easily maintained. Furthermore, it can operate with alternating-current power since there is less likelihood of damage to its power connections.

The data receiver 91a will demodulate the signal received and will transmit a binary signal to decoder/multiplexer 83. Other receivers, tuned to different frequencies, such as data receiver 91b, will be similarly connected to decoder/multiplexer 83.

Decoder/multiplexer 83 receives binary signals from the receivers connected to it. In a preferred embodiment, it also receives a continuous input from clock circuit 87 which has the date and time encoded. The decoder/multiplexer 83 combines the binary signals from the receivers 81, 91 with the date and time signal from clock 87 and transmits a signal to the recorder 85. It also transmits a signal to display 89 which typically has a panel of indicators, such as light-emitting diodes, which displays the identification of the snubber which generated a load indication. The indicator will remain active until reset by maintenance personnel.

The recorder 85 can be a magnetic tape unit, a printer, a disk drive, or other similar means for retaining a permanent record of the snubber identifications and the date and time of the load condition. This information will allow maintenance personnel to correlate the occurrence of a load condition with other events which may have happened at the facility. Other means of maintaining a record of time of occurrence could be used such as recording on a graph which has a prerecorded time scale.

Maintenance personnel will use the device to eliminate the guesswork associated with the previous methods of determining snubber failure. Rather than manually test the scheduled 10% of the snubbers during any given maintenance operation, the maintenance personnel will examine the display panel and review the log books for any previously displayed failures which have been reset. Thus, the maintenance efforts can be directed toward only those snubbers which have indicated a failure, and the maintenance personnel do not have to spend any unnecessary time in a potentially hazardous environment testing non-defective snubbers. Furthermore, there is significantly less probability that a defective snubber will go undetected for a number of years until the time for its scheduled maintenance test.

In addition to detecting snubber failures, the monitoring system described herein has other uses with regard to the detection of transient conditions within the generating facility. A particular advantage of the combination of date and time recording along with the identification is for the detection of a water hammer condition. This condition occurs when thermal changes or load changes within the piping system create a traveling pressure wave through the material carried by the pipes. If the pressure wave travels through the pipes at the resonant frequency of the piping system, a transient vibration can occur which can cause damage to the pipes. Although the rapid changes will be effectively snubbed by the snubbing devices, repeated water hammer conditions can eventually cause damage to the piping system.

A water hammer condition can be detected as a transient overload condition in a series of snubbers connected in the same vicinity. Although there is no sustained overload condition, the intermittent overload will have been detected and recorded by the system. When the magnetic tape, printout or other recording medium is analyzed, the maintenance personnel can determine from the recorded date and time that a water hammer condition has occurred in a specific area of the piping system. Corrective measures can then be taken to alter the piping system or the operating conditions to prevent future occurrences of the water hammer.

The present invention can also be used to detect a defective snubber which fails in a condition where it does not exert any force to retard the movement of the pipe to which it is connected. If a rapid movement of the piping system occurs, such as occurs during an earthquake or a water hammer condition, generally all of the snubbers connected to the affected system will encounter a transient load condition which will be detected and recorded. If one of the snubber load indicators in a system fails to register the load condition, there is a substantial probability that the snubber corresponding to that indicator is defective. Thus, the maintenance personnel can perform further tests on that particular snubber to determine whether it is operating properly.

In an alternative embodiment of the apparatus, the threshold comparator circuit of FIG. 4 is modified to include an analog-to-digital conversion circuit or other means to convert the output of the strain gage 37 to digital data. This is illustrated in FIG. 7 which includes a force sensing circuit 101 which can be the bridge circuit 33 of FIG. 4. The output voltage of the force sensing circuit 101 is the input to the analog-to-digital conversion circuit 103 which converts the analog output of the force sensing circuit 101 to digital data. The digital data is typically a signed binary number which represents the magnitude and direction of the force on the snubber 1 (FIG. 2) as detected by the force sensing circuit 101. For example, if an 8-bit analog-to-digital conversion circuit is used, each positive binary number (i.e., 00000000 to 01111111) represents a force in one direction having one of 128 incremental values. In an exemplary system, the maximum force on the snubber may be on the order of 1,270 pounds, and each of the binary numbers could represent a ten-pound increment in the force (e.g., 00000001=10 pounds; 01111111=1270 pounds, etc.). Similarly, if the negative binary numbers are in two's-complement notation (i.e., 11111111=−1; 11111110=−2; etc.), then the binary numbers from 11111111(−1) to 10000001 (−127) represent ten-pound increments in force in the opposite direction (i.e., −1270 pounds to −10 pounds). Alternatively, the binary representation of the force can be in the sign/magnitude format (i.e., 00000001=+1; 10000001=−1; etc.). Furthermore, the number of binary digits representing the magnitude of the force can be increased or decreased for more or less incremental resolution of the detected force. The weight given to each incremental binary value can vary with the maximum anticipated force and the resolution (i.e., number of binary digits).

The digital data representing the magnitude and direction of the force detected by the force sensing circuit 101 is the output of the analog-to-digital conversion circuit 103 and is provided as an input to a threshold comparator circuit 105 and to an encoder 107. The threshold comparator circuit 105 performs the same function as the threshold comparator circuit 61 in FIG. 4; however, the comparison between the threshold value and the output of the analog-to-digital conversion circuit 103 is performed by digital means. Typically, the threshold comparator circuit 105 has an internal register which is initialized with the binary representation of the threshold value of the force to be detected. When the magnitude of the detected force exceeds the threshold value, the threshold comparator circuit will activate a signal on line 115 to the data transmitter 111, which signal will actuate a relay or other power control circuit within the data transmitter 111 to apply power to the data transmitter 111.

When the power is applied to the data transmitter 111, the data transmitter 111 will generate a radio frequency signal which is modulated with the output of the encoder circuit 107. The output of encoder circuit 107 is a serial modulation signal which is a binary representation of the identification of the snubber on which the excessive force was detected. The identification is provided by code select circuit 109. Furthermore, the serial modulation output of encoder 107 includes the output of the analog-to-digital circuit 103 which has been converted by the encoder 107 to a serial data stream to follow the serial data stream representing the identification of the snubber.

The signal transmitted by data transmitter 111 is received by a remote data receiver 121 which demodulates the identification and force data in a conventional manner such as was described in connection with FIG. 6. The ID output 125 of the data receiver 121 comprises the identification of the snubber on which the force was detected, and the DATA output 123 comprises the binary representation of the magnitude and direction of the force which was detected. The two outputs 123,125 of the data receiver 121 can be monitored and recorded by conventional means such as was described above in connection with FIG. 6.

In another alternative embodiment of the apparatus illustrated in FIG. 8, the force sensing circuit 101 of FIG. 7 is replaced with a displacement sensing circuit 129 which provides an output proportional to the physical displacement of the snubber from a baseline such as the fixed mounting surface 3. The displacement sensing circuit 129 is schematically illustrated as a linear potentiometer; however, other means for converting displacement to a variable signal could be used. The output of the displacement sensing circuit 129 is converted to a binary representation of the displacement by analog-to-digital conversion circuit 131 which operates in a manner similar to that described for conversion circuit 103 in connection with FIG. 7. The threshold comparator circuit 133 operates in a manner similar to that described above in connection with comparator 105 except that the internal register in the threshold comparator circuit 133 is initialized with a value which represents the acceptable limits of travel of the pipe snubber 1. Typically, the displacement sensing circuit 129 is adjusted such that the average displacement of the snubber 1 in normal operation results in a binary representation of zero on the output of the analog-to-digital conversion circuit 131; and, therefore, the threshold comparator circuit 133 can detect excessive displacement in either direction.

The output of the threshold comparator circuit 133 activates the data transmitter 137 in the manner described above in connection with FIG. 7. The encoded displacement data and snubber identification is transmitted to a data receiver 141 which provides the demodulated data and identification as outputs on lines 143 and 145, respectively, to be monitored and/or recorded.

The embodiments of FIGS. 7 and 8 can be combined in one embodiment to sense both force and displacement and transmit a signal if either the force or the displacement exceed their respective threshold magnitudes. In this combined embodiment, illustrated in FIG. 9, only one data transmitter 137, one encoder circuit 135, and one code select circuit 139 is necessary if the information is transmitted to the same data receiver and monitoring and recording system. The force and displacement sensing circuits 101, 129, analog-to-digital conversion circuits 103, 135, and threshold comparator circuits 105,133 continue to operate in the manner previously described. The encoder 135 will sequentially modulate the data transmitter 137 with the serial binary representations of the identification, the force, and the displacement. The data receiver 141 at the remote monitoring location typically has a separate demodulated output 143a for force and output 143b for displacement as well as an identification output 145.

FIG. 9 illustrates an especially preferred embodiment in which the embodiments of FIGS. 7 and 8 have been combined to provide monitoring of both displacement and force as described above. In addition, the embodiment of FIG. 9 includes a command receiver 151, which is typically a battery-operated receiver having low power consumption. The command receiver 151 is tuned to the frequency of a command transmitter 155 located in the non-hazardous remote monitoring area. The command transmitter 155 typically operates on a frequency which is different from the previously described data transmitter 137. When actuated, the command transmitter 155 transmits a command signal which has been modulated with a serial data stream which represents the identification of one of the snubbers. The command receiver 151 includes an identification detection circuit 153 which continuously monitors the output of the command receiver 151. When the serialized digital data received by the command receiver 151 corresponds to the identification of the snubber associated with the command receiver 151, the identification detection circuit 153 activates an output signal on line 157 which activates a relay or other power control circuit in the data transmitter 137 in a manner similar to the output of the threshold comparator circuit 133. The data transmitter 137 responds by transmitting a signal which is modulated with the snubber identification and the force and displacement magnitudes as described above.

In this especially preferred embodiment, the command transmitter 155 will typically transmit the identifications of each of the snubbers in a system in sequence. Thus, all the snubbers in a system can be monitored on a periodic or a continuous basis without waiting for an excessive force or displacement. Furthermore, the force and displacement sensors, the encoders, and the data transmitters can be periodically tested to verify their operability.

What is claimed is:

1. An apparatus for monitoring pipe motion snubbers in a piping system, comprising:
   sensing circuits which measure the effects of pipe movement on the pipe motion snubbers;
   data transmitters, electrically connected to the sensing circuits, which transmit signals responsive to the measured effects, which signals identify the pipe motion snubbers on which the effects are measured;
   data receivers which receive the transmitted signals from a plurality of data transmitters and which generate output signals which identify the pipe motion snubbers on which the effects were measured; and
   a device, electrically connected to the output of the data receivers, which indicates the pipe motion snubbers on which the effects were measured.

2. The apparatus of claim 1, wherein the measured effects are the forces on the pipe motion snubbers.

3. The apparatus of claim 1, wherein the measured effects are the displacements of the pipe motion snubbers.

4. The apparatus of claim 1, which further includes comparator circuits which detect the presence of measured effects in excess of preset amounts, and which generate output signals responsive to said excessive measured effects.

5. The apparatus of claim 1, wherein the data transmitters transmit signals to the data receivers by wireless radio frequency transmission.

6. The apparatus of claim 1, wherein the data transmitters and the data receivers are electromagnetically interconnected via the piping system.

7. The apparatus of claim 1, wherein the indicating device includes a recording means which maintains a permanent record of the measured effects.

8. The apparatus of claim 7, further including a decoder/demultiplexer circuit electrically connected to a plurality of data receivers, which combines the signals from said receivers and generates an output signal to the indicating device.

9. The apparatus of claim 8, further including a clock circuit which generates a signal to the decoder/demultiplexer circuit and to the recording means, which signal is encoded with the date and time.

10. The apparatus of claim 1, which further includes data conversion circuits which convert the signal outputs of the sensing circuits to digital representations of the effects measured by the sensing circuits, and data encoding circuits which generate modulation signals to the data transmitters responsive to said digital representation.

11. The apparatus of claim 1, which further includes a command transmitter which transmits pipe motion snubber identification signals to command receivers electrically connected to the data transmitters, which command receivers respond to said pipe motion snubber identification signals by activating the data transmitters corresponding to said pipe motion snubber identification signals.

12. A method of monitoring the occurrence of effects on pipe motion snubbers, comprising the steps of:
   measuring the effects of pipe movement on the pipe motion snubbers;
   transmitting signals responsive to the measured effects, which signals identify the pipe motion snubbers on which the effects are measured;
   receiving the transmitted signals and generating output signals which identify the pipe motion snubbers on which the effects were measured; and
   indicating the pipe motion snubbers on which the effects were measured.

13. The method of claim 12 wherein the measured effects are the forces on the pipe motion snubbers.

14. The method of claim 12 wherein the measured effects are the displacements of the pipe motion snubbers.

15. The method of claim 12 which further includes the step of recording the dates and times of occurrence of the measured effects.

16. The method of claim 12 wherein the measuring step comprises converting the magnitudes of sensed effects to digital data and transmitting said digital data with the signals which identify the pipe motion snubbers on which the effects are measured.

17. The method of claim 12 wherein the transmitting steps are performed in response to measured effects in excess of preset amounts.

18. The method of claim 12 wherein the transmitting steps are performed in response to commands.

* * * * *